United States Patent
Thomas

(10) Patent No.: US 7,140,245 B2
(45) Date of Patent: Nov. 28, 2006

(54) WIND VANE FOR GOLFERS

(76) Inventor: Jay A. Thomas, 6 New Hampshire Ave., Nashua, NH (US) 03063

( * ) Notice: Subject to any disclaimer, the term of this patent is extended or adjusted under 35 U.S.C. 154(b) by 0 days.

(21) Appl. No.: 10/888,382

(22) Filed: Jul. 9, 2004

(65) Prior Publication Data

US 2006/0005618 A1    Jan. 12, 2006

(51) Int. Cl.
*A63B 53/00* (2006.01)

(52) U.S. Cl. .................................... 73/170.01

(58) Field of Classification Search . 73/170.01–170.15
See application file for complete search history.

(56) References Cited

U.S. PATENT DOCUMENTS

| | | | |
|---|---|---|---|
| 3,870,300 A | 3/1975 | Amendola | 273/32 B |
| 4,509,751 A | 4/1985 | Tabet | 273/32 H |
| 4,719,798 A | 1/1988 | Orkin | 73/189 |
| 4,854,579 A | 8/1989 | Baxter | 273/32 H |
| 5,209,441 A | 5/1993 | Stoat | 248/74.2 |
| 5,540,181 A * | 7/1996 | Pearce | 116/173 |
| 5,734,102 A | 3/1998 | Stevens | 73/170.05 |
| 6,032,523 A | 3/2000 | Smith | 73/170.07 |
| 6,612,528 B1 | 9/2003 | Bagdi | 248/71 |

* cited by examiner

*Primary Examiner*—Edward Lefkowitz
*Assistant Examiner*—Jermaine Jenkins
(74) *Attorney, Agent, or Firm*—John H. Pearson, Jr., Esq.; Walter E. Dawson, Esq.; Pearson & Pearson, LLP

(57) ABSTRACT

A wind vane that easily snaps on to golf equipment such as the pole of a golf bag for visually indicating wind direction to a golfer comprises two side elements attached to each other at a junction along the side elements' edges forming approximately a 50 degree angle between the side elements, and a partially opened cylindrical clamp. A ring holder is provided on the inside surface of each of the side elements. A plurality of ribbons extend from each of the ring holders and the movement of such ribbons indicate the direction and to some extent the speed of the wind. An alternate embodiment of the wind vane comprises arms that clip onto a canopy pole of a golf cart and a plurality of ribbons to indicate wind direction.

22 Claims, 7 Drawing Sheets

WIND VANE FOR GOLFERS

BACKGROUND OF THE INVENTION

1. Field of the Invention

This invention relates generally to determining wind direction and more particularly to a device for attaching to golf equipment such as golf carts or golf bags to enable a golfer to determine the direction of the wind.

2. Description of Related Art

The direction of the wind on a golf course is very important to a golfer. A cross-wind to the direction of the ball flight forces the golf ball to turn toward the direction of the wind. A head wind or a tail wind affects the distance a golf ball travels. Therefore, a golfer who knows the wind direction can hit the golf ball in a manner that compensates for the wind direction in order to achieve a more accurate golf shot.

U.S. Pat. No. 4,719,798 issued Jan. 19, 1988 to Henry E. Orkin discloses a wind direction finder for use on a golf cart. The wind direction finder comprises a fastener portion and a ribbon portion. The fastener portion includes an adhesive material for attaching to a canopy frame post of the golf cart. As the wind blows between the main body of the golf cart and the canopy, the wind lifts the free end of the ribbon and the angle, direction and speed of the wind can be observed by the golfer to indicate both direction and speed of the wind. However, the adhesive material of the fastener does not permit the wind direction finder to be quickly and easily removed and reattached to other golf equipment.

U.S. Pat. No. 4,509,751 issued Apr. 9, 1985 to Michael A. Tabet discloses a combination golf retriever and wind indicator. The golf ball retriever is in the form of a wind sock having an open large end and a small end too small for the golf ball to exit. When the wind sock is held in the air at the end of a telescoping rod it functions as a wind sock indicating the direction and intensity of the wind. However, this device requires the user to take additional action to grasp the rod and extend it into the air instead of being able to quickly observe wind direction while getting ready to hit the ball. Also, wind direction can quickly change between the time of the reading of the wind sock and the time of addressing the ball with a golf club.

U.S. Pat. No. 6,032,523 issued Mar. 7, 2000 to Randolph A. Smith discloses a golf wind sock assembly 10 for visually indicating wind direction in a continuous manner. A wind sock 16 rotates 360 degrees about a shaft 22 to determine the direction of the wind. Another wind sock assembly 20 provides an instrument to indicate wind force and speed. However, driving through woods or tree-lined areas on a golf course could be restrictive resulting in the sock getting hung-up or the pole bent, and it is cumbersome to install to the roof of the golf cart and carry on a golf bag.

SUMMARY OF THE INVENTION

Accordingly, it is therefore an object of this invention to provide an apparatus which a golfer can easily attach to a golf bag or a golf cart to provide continuous information on the wind direction and some indication of the wind speed.

It is another object of this invention to provide a golfer with a wind vane that snaps on a leg assembly attached to a golf bag.

It is another object of this invention to provide a golfer with a wind vane that snaps on a canopy support of a golf cart.

It is a further object of this invention to provide a golfer's wind vane with surfaces for advertising a company's name or trademark.

It is another object of this invention to provide a wind vane that attaches and detaches easily to and from golf equipment.

These and other objects are further accomplished by a wind vane comprising means for clamping the wind vane to a support element of golf equipment and means connected to the clamping means for indicating wind direction. The clamping means comprises a slot for securely fitting around a support element of the golf equipment. The wind direction indicating means comprises at least one ribbon of predetermined dimensions to respond to a wind.

The objects are further accomplished by a wind vane comprising a first side element and a second side element attached to each other at a portion of their edges to form an acute angle, a partially open clamp located between the first side element and the second side element, a first ring holder extending from one of the first side element or the second side element, and at least one ribbon attached to the first ring holder of predetermined dimensions to respond to a wind. The acute angle comprises an angle of approximately fifty degrees. The wind vane comprises a second ring holder extending from one of the first side element or the second side element not comprising the first ring holder. At least one ribbon is attached to the second ring holder of predetermined dimensions to respond to a wind. The open portion of the clamp attaches to a leg or pole of golf equipment. The outside surface of the first side element and the second side element comprises a surface for receiving a personal or business identification including a name, logo, trademark or service mark. The outside surface of the first side element and the second side element comprises a convex surface. The ribbon attached to the first holder comprises a first collar having a ring passing through the collar and the first ring holder. The ribbon attached to the second ring holder comprises a second collar having a ring passing through the collar and the second ring holder.

The objects are further accomplished by a wind vane comprising an attachment section having a first side element and a second side element attached to each other at a portion of their edges to form an acute angle, a first arm of the attachment section attaches to an inner side of the first side element, and the first arm extends away from the first side element at a first predetermined angle, a second arm attaches to an inner side of the second side element, and the second arm extends away from the second element at a second predetermined angle, whereby the first arm and the second arm are parallel to each other, a first triangular section positioned between the first arm and the second arm and within an apex of the acute angle, a second triangular section positioned for support between the first side element and the first arm, a third triangular section positioned for support between the second side element and the second arm, and means connected to the attachment section for indicating wind direction. The wind direction indicating means comprises at least one ribbon of predetermined dimensions to respond to the wind. The first predetermined angle of the first arm extending away from the first side element is approximately 140 degrees. The second predetermined angle of the second arm extending away from the second side element is approximately 140 degrees.

Additional objects, features and advantages of the invention will become apparent to those skilled in the art upon consideration of the following detailed description of the preferred embodiments exemplifying the best mode of carrying out the invention as presently perceived.

BRIEF DESCRIPTION OF THE DRAWINGS

The appended claims particularly point out and distinctly claim the subject matter of this invention. The various objects, advantages and novel features of this invention will be more fully apparent from a reading of the following detailed description in conjunction with the accompanying drawings in which like reference numerals refer to like parts, and in which:

DESCRIPTION OF ILLUSTRATIVE EMBODIMENT

Figure 1:
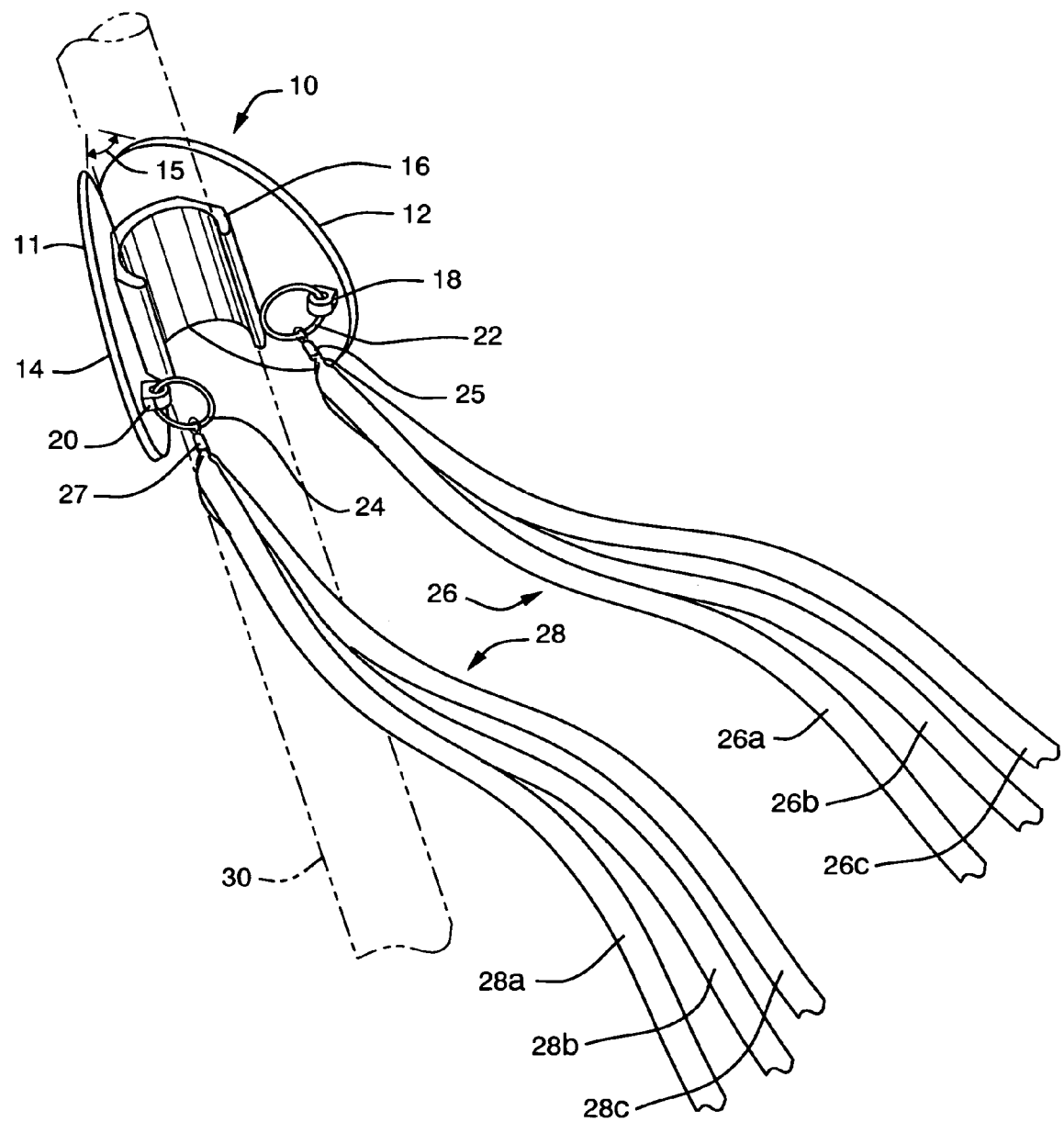
FIG. 1 is a perspective view of a wind vane according to a first embodiment of the invention.
Figure 2:
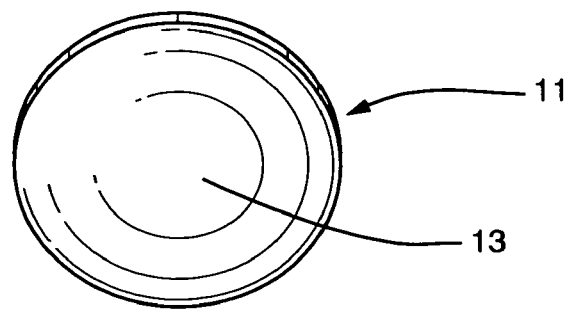
FIG. 2 is a side elevational view of the attachment section of the first embodiment of the invention.
Figure 3:
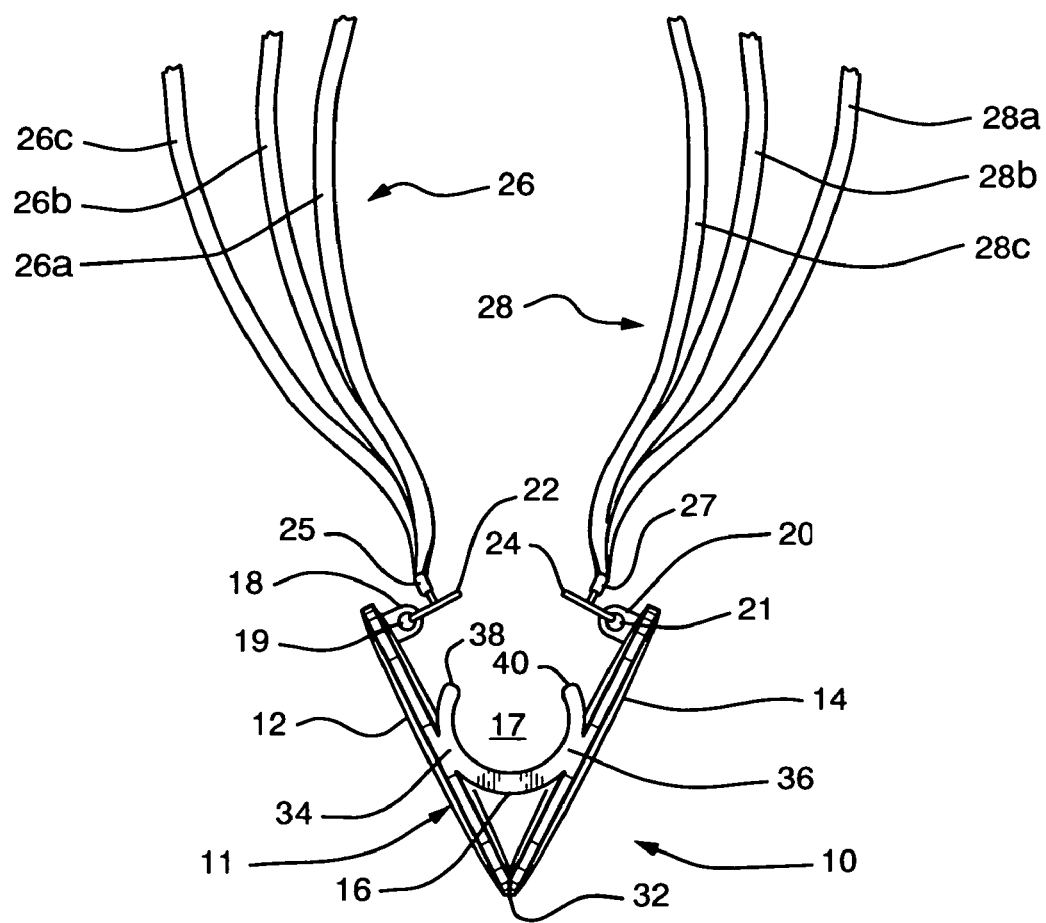
FIG. 3 is a top view of the attachment section and the ribbon section of the first embodiment of the wind vane invention.

Referring to FIGS. 1–3, FIG. 1 is a perspective view of a wind vane 10 according to the present invention comprising an attachment section 11 and ribbon sections 26, 28 for indicating wind direction particularly for a golfer. FIG. 2 is a side elevational view of a first embodiment of the invention without the ribbons attached, and FIG. 3 is a top view of the attachment section 11 and the ribbon sections 26, 28 of a first embodiment of the wind vane 10. The ribbon sections 26, 28 comprise ribbon groups 26a–26c and 28a–28c. The attachment section 11 comprises two side elements 12, 14 attached to each other at a junction 32 along a portion of their edges forming an acute angle 15 of approximately 50.5 degrees; other acute angles may be embodied depending on design preferences.

The side elements 12 and 14 each have a circular configuration but other geometric configurations may also be used and are within the scope of this invention. Further, the circular elements 12, 14 comprise a convex outer surface 13 which gives the appearance of a golf ball, and the outer surface 13 may be dimpled to present a more realistic appearance of a golf ball.

A clamp 16 is provided within the acute angle 15 opening. The clamp 16 comprises side portions 34, 36 which are integral with the inside surfaces of side elements 12 and 14. A slot 17 is provided through the clamp 16. The slot 17 is open on one side to facilitate insertion and removal of the wind vane 10 on a support pole 30 such as a leg assembly on a golf bag. The outer free ends 38, 40 of C-shaped arms 34, 36 act as camming surfaces and help to separate the arms 34, 36 while the wind vane 10 is being pushed onto a pole 30. When the wind vane 10 is fully inserted, the arms 34, 36 snap into position around the pole 30. The C-shaped arms 34, 36 illustrate the preferred design for receiving a cylindrical component such as the pole 30, but other arm shapes to suite other poles on support structures are within the scope of this invention.

Still referring to FIGS. 1–3, a ring holder 18 extends from side element 12 and a ring holder 20 extends from side element 14 just beyond the opening 17 in the clamp 16 and near the outer edge of the side elements 12 and 14. A hole 19 in ring holder 18 holds a ring 22 comprising at least one ribbon, but generally holds at least three ribbons 26a–26c. Likewise, a hole 21 in ring holder 20 holds a ring 24 comprising at least one ribbon, but generally at least three ribbons 28a–28c. The length of each ribbon assembly 26, 28 is typically approximately 8.5 inches. This length may vary but if it is too short, a soft wind will not move it and if the length of the ribbons 26a–26c is too long, it will be a nuisance by getting caught in miscellaneous items. Each ribbon assembly 26, 28 comprises an end cap with a loop 25, 27 and a 9 mm jump ring 22, 24.

Figure 4:
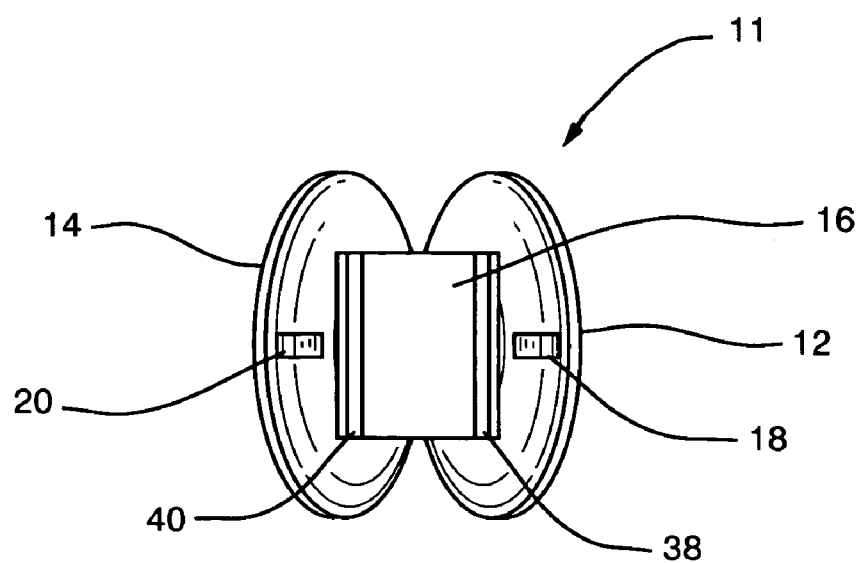
FIG. 4 is a rear view of the attachment section of the first embodiment of the invention.
Figure 5:
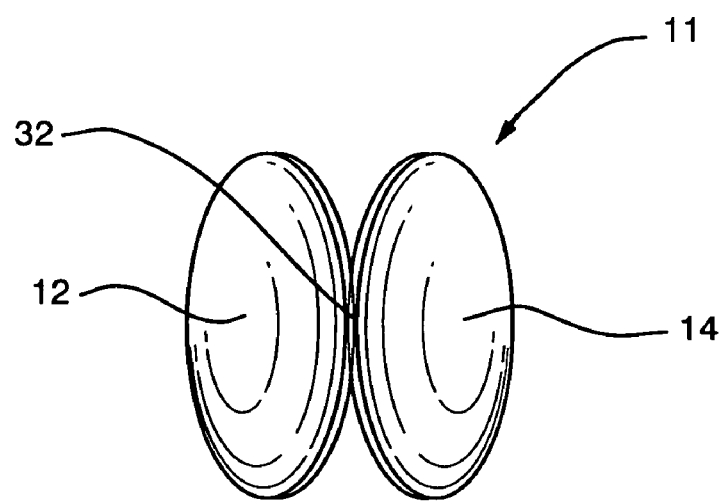
FIG. 5 is a front view of the attachment section of the first embodiment of the invention.

Referring to FIG. 4 and FIG. 5, FIG. 4 is a rear view of the attachment section 11 of the wind vane 10 showing the clamp 16 located between the side elements 12 and 14. FIG. 5 is a front view of the attachment section 11 of the wind vane 10 showing the junction 32 of the two side elements 12 and 14.

Referring to FIGS. 1–5, the preferred embodiment comprises the following dimensions: the side elements 12 and 14 are each approximately 1.4 inches in diameter. The opening of the clamp 16 is approximately 0.45 inches and the diameter of the slot 17 is approximately 0.5 inches. The distance between the holes 19 and 21 of the ring holders 18 and 20 is approximately 0.9 inches when the angle between the side elements 12 and 14 is 50.5 degrees. The ribbon assemblies 26, 28 are approximately 8.5 inches long and comprise a 4×9 mm end caps w/loop and 9 mm jump rings manufactured by Hirschberg Schutz & Company, Inc. of Union, N.J. The ribbons 26a–26c are made of a polyester material manufactured by C.M. Offray & Son, Inc. of Chester, N.J.

Alternate Embodiment

Figure 6:
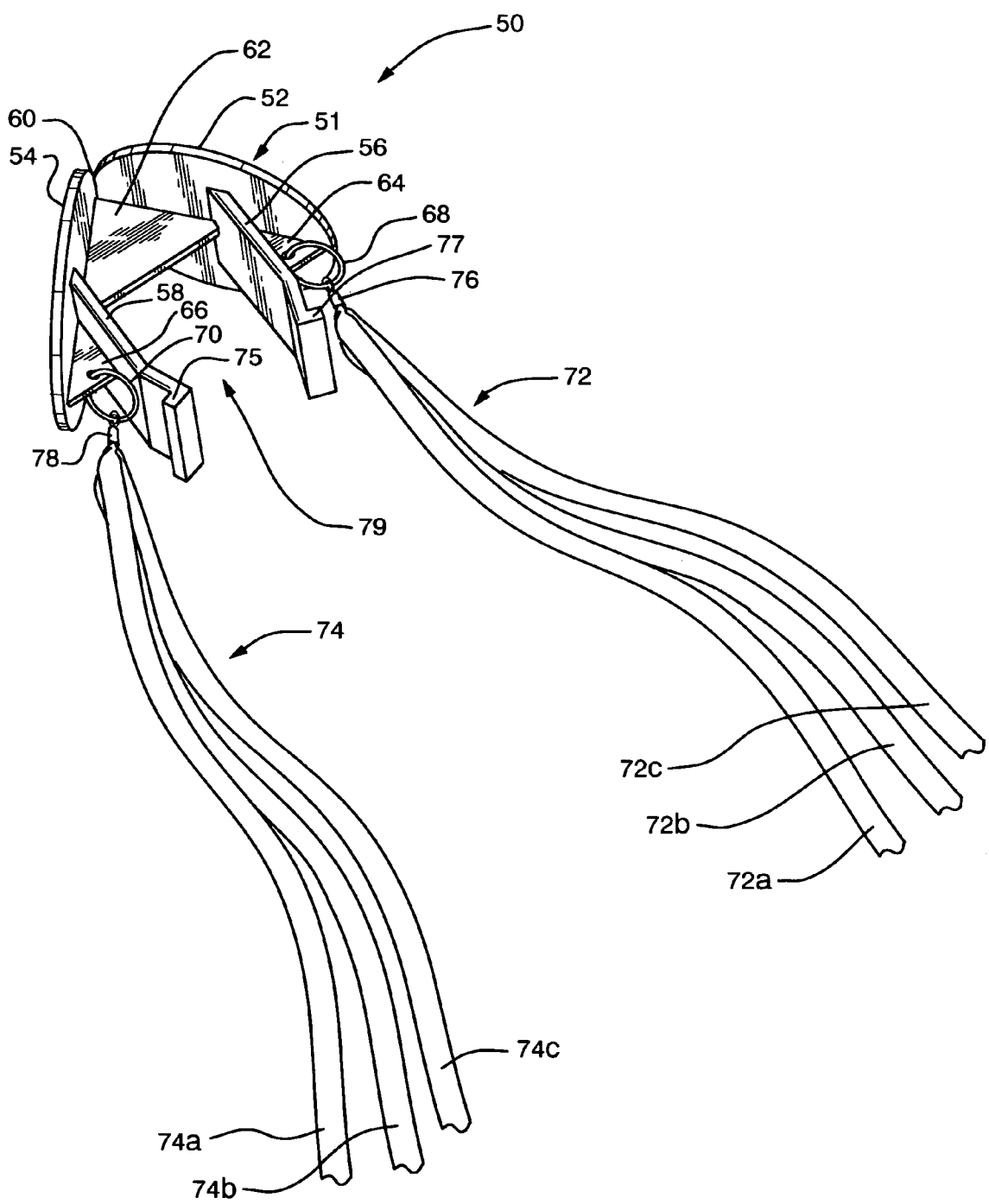
FIG. 6 is a perspective view of a wind vane according to a second embodiment of the invention.
Figure 7:
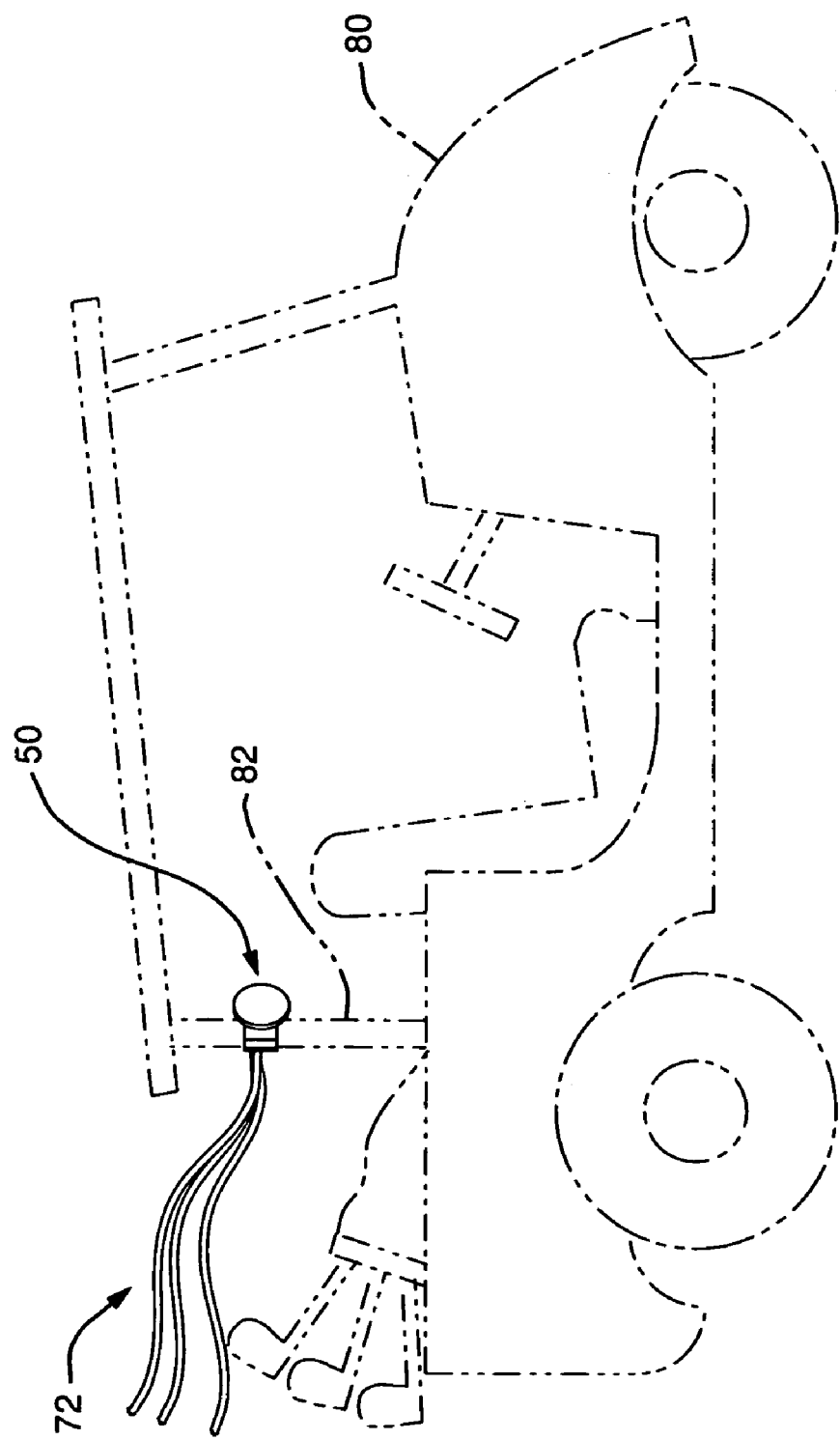
FIG. 7 is a side elevational view of a second embodiment of the invention attached to a pole of a golf cart.
Figure 8:
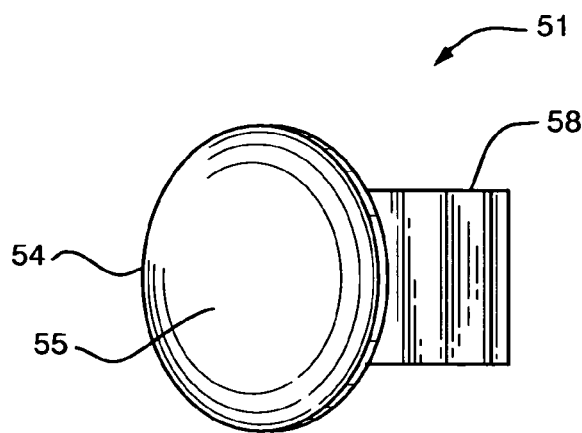
FIG. 8 is a side elevational view of the attachment section of the second embodiment of the invention.

Referring now to FIG. 6, FIG. 7 and FIG. 8, FIG. 6 is a perspective view of a wind vane 50 according to an alternate or second embodiment of the invention. Wind vane 50 is constructed to fit primarily around a square or rectangular pole as shown in FIG. 7. FIG. 7 is a side elevational view of the wind vane 50 attached to a roof support pole 82 of a golf cart 80. FIG. 8 is a side elevational view of the attachment section 51 of the wind vane 50. The wind vane 50 comprises an attachment section 51 and ribbon sections 72 and 74. The ribbon sections 72 and 74 comprise ribbon groups 72a–72c and 74a–74c.

Figure 9:
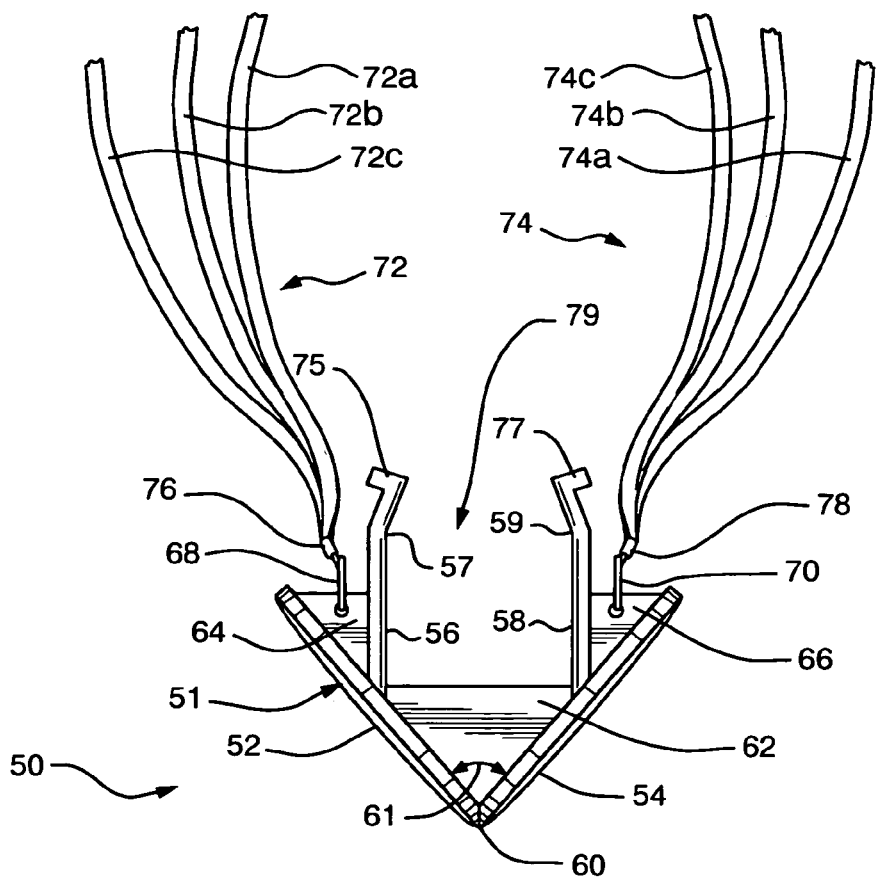
FIG. 9 is a top view of the attachment section and ribbon section of the second embodiment of the invention.

Referring to FIG. 6 and FIG. 9, FIG. 9 is a top view of the attachment section 51 and the ribbon sections 72 and 74 of the second embodiment. The attachment section 51 comprises side elements 52 and 54 which have a circular configuration, but other geometric configurations may also be used and are within the scope of this invention. Further, the circular side elements 52, 54 comprise a convex outer surface 55 (FIG. 8) which gives the appearance of a golf ball, and the outer surface may be dimpled to present a more realistic appearance of a golf ball. The side elements 52, 54 are attached to each other at a junction 60 along a portion of their edges forming an acute angle 61 of approximately 100 degrees; other acute angles may be embodied depending on the design preferences. Two arms 56, 58 protrude away from the inside surface of the side elements 52, 54 at an angle of approximately 140 degrees 49, 53 for providing a slot 79 for attaching to a pole 82. The arms 56, 58 are supported by triangular support sections 62, 64 and 66. Triangular support section 62 fits within the acute angle 61 providing support for maintaining the side elements 52, 54 at the predetermined acute angle 61. Triangular support section 64 is positioned between the side element 52 and the first arm 56, and triangular support section 66 is positioned between the side element 54 and the second arm 58. Outer portions 57, 59 of the first arm 56 and second arm 58 angle inward toward each other at approximately a 20 degree angle which enables the side arms 56, 58 to snap around a pole typically a rectangular pole 82 and to maintain a particular position along the rectangular pole 82. The distal end 75 of first arm 56 is angled outward 90 degrees from the plane of the outer portion 57 of first arm 56, and the distal end 77 of the second arm 58 is angled outward 90 degrees from the plane of the outer portion 59 of the second arm 56. To further insure that the wind vane 50 maintains its position on the pole 82, a foam insert is attached to the inside surfaces of each of the first arm 56 and the second arm 58. Such a foam is referred to as "sticky foamie", and it is manufactured by Darice, Inc. of Strongsville, Ohio.

Figure 10:
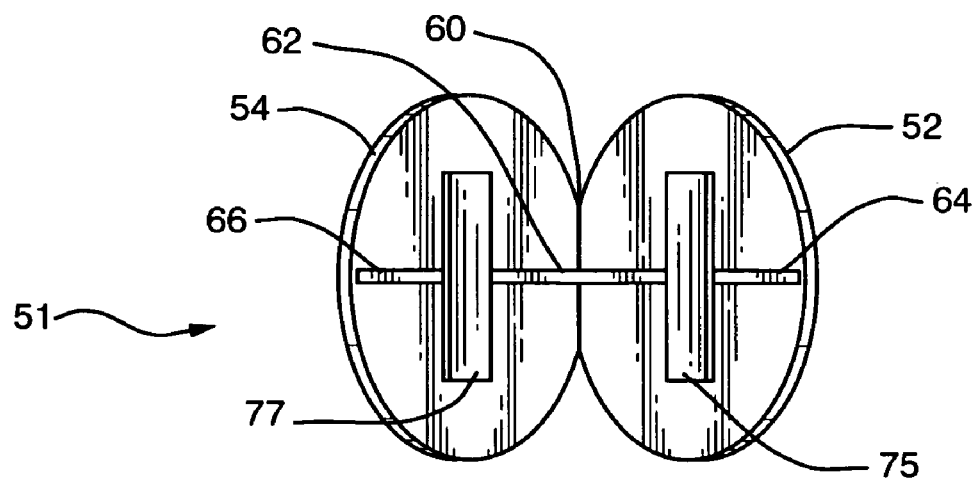
FIG. 10 is a rear view of the attachment section of the second embodiment of the invention.
Figure 11:
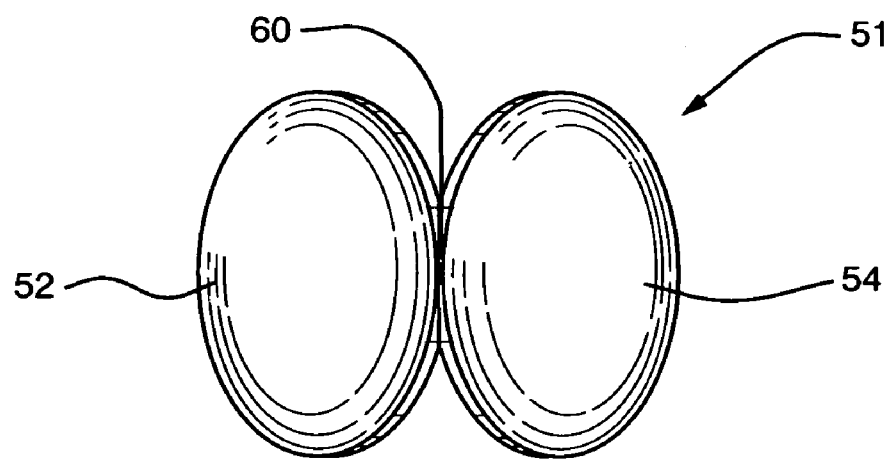
FIG. 11 is a front view of the attachment section of the second embodiment of the invention.

Referring now to FIG. 10 and FIG. 11, FIG. 10 is a rear view of the attachment section 51 of the second or alternate embodiment of the invention, and FIG. 11 is a front view of the attachment section 51 of the invention. Both FIGS. 10 and 11 show the junction 60 between the side elements 52, 54 where the side elements 52, 54 are joined.

Referring to FIGS. 6, and 8–11, the second or alternate embodiment comprises the following dimensions: The side elements 52, 54 are approximately 1.75 inches in diameter. The height of the first arm 56 and the second arm 58 is 1.0 inches, and the distance between the main portion of the first arm 56 and the second arm 58 is 1.06 inches. The distance along the first arm 56 and the second arm 58 to the points where the inward 30 degree angle occurs is 0.88 inches. The thickness of each of the triangular support sections 62, 64, 66 is approximately 0.060 inches. The ribbon assemblies 72, 74 are approximately 8.5 inches long and comprise 4×9 mm end caps with loop and 9 mm jump rings manufactured by Hirschberg Schultz & Company, Inc. of Union, N.J. The ribbons 72a–72c and 74a–74c are made of a polyester material manufactured by C.M. Offroy & Son, Inc. of Chester, N.J.

This invention has been disclosed in terms of certain embodiments. It will be apparent that many modifications can be made to the disclosed apparatus without departing from the invention. Therefore, it is the intent of the appended claims to cover all such variations and modifications as come within the true spirit and scope of this invention.

What is claimed is:

1. A wind vane comprising:
   means for clamping said wind vane to a support element of golf equipment, said clamping means comprises a first side element and a second side element attached to each other at a portion of their edges to form an acute angle an inside surface of said first side element and said second side element form a pair of flexible arms for grasping a pole of said golf equipment; and
   means connected to said clamping means for indicating wind direction.

2. The wind vane as recited in claim 1 wherein said clamping means comprises a slot for securely fitting around a support element of said golf equipment.

3. The wind vane as recited in claim 1 wherein said wind direction indicating means comprises at least one ribbon of predetermined dimensions to respond to a wind.

4. A wind vane comprising:
   a first side element and a second side element attached to each other at a portion of their edges to form an acute angle;
   a partially open clamp located between said first side element and said second side element;
   a first ring holder extending from one of said first side element or said second side element; and
   at least one ribbon attached to said first ring holder of predetermined dimensions to respond to a wind.

5. The wind vane as recited in claim 4 wherein said acute angle comprises an angle of approximately fifty degrees.

6. The wind vane as recited in claim 4 wherein said wind vane comprises a second ring holder extending from one of said first side element or said second side element not comprising said first ring holder.

7. The wind vane as recited in claim 6 wherein at least one ribbon is attached to said second ring holder of predetermined dimensions to respond to a wind.

8. The wind vane as recited in claim 4 wherein said open portion of said clamp attaches to a leg or pole of golf equipment.

9. The wind vane as recited in claim 4 wherein said outside surface of said first side element and said second side element comprises a surface for receiving a personal or business identification including a name, logo, trademark or service mark.

10. The wind vane as recited in claim 4 wherein said outside surface of said first side element and said second side element comprises a convex surface.

11. The wind vane as recited in claim 4 wherein said ribbon attached to said first holder comprises a first collar having a ring passing through said collar and said first ring holder.

12. The wind vane as recited in claim 7 wherein said ribbon attached to said second ring holder comprises a second collar having a ring passing through said collar and said second ring holder.

13. A wind vane comprising:
   an attachment section having a first side element and a second side element attached to each other at a portion of their edges to form an acute angle;
   a first arm of said attachment section attaches to an inner side of said first side element, and said first arm extends away from said first side element at a first predetermined angle;
   a second arm attaches to an inner side of said second side element, and said second arm extends away from said second element at a second predetermined angle, whereby said first arm and said second arm are parallel to each other;
   a first triangular section positioned between said first arm and said second arm and within an apex of said acute angle;
   a second triangular section positioned for support between said first side element and said first arm;
   a third triangular section positioned for support between said second side element and said second arm; and
   means connected to said attachment section for indicating wind direction.

14. The wind vane as recited in claim 13 wherein said attachment section comprises a foam insert having a sticky backing attached to an inside surface of said first arm and said second arm.

15. The wind vane as recited in claim 13 wherein a distal portion of said first arm and said second arm bends inward at a predetermined angle to secure said wind vane when attached to a pole.

16. The wind vane as recited in claim 13 wherein an outer surface of said first side element and said second side element comprises a convex surface.

17. The wind vane as recited in claim 13 wherein said wind direction indicating means comprises at least one ribbon of predetermined dimensions to respond to said wind.

18. The wind vane as recited in claim 13 wherein said wind direction indicating means comprises a plurality of ribbons extending from said attachment section.

19. The wind vane as recited in claim 13 wherein:
said wind direction indicating means comprises a first group of ribbons attached to said second triangular section; and
a second group of ribbons attached to said third triangular section.

20. The wind vane as recited in claim 13 wherein said outside surface of said first element and said second element comprises a surface for receiving a personal or business identification including a name, logo, trademark or service mark.

21. The wind vane as recited in claim 13 wherein said first predetermined angle of said first arm extending away from said first side element is approximately 140 degrees.

22. The wind vane as recited in claim 13 wherein said second predetermined angle of said second arm extending away from said second side element is approximately 140 degrees.

* * * * *